United States Patent
Radivojevic et al.

(10) Patent No.: US 8,824,704 B2
(45) Date of Patent: Sep. 2, 2014

(54) SURFACE TEXTURE RECORDING WITH MICROPHONE

(75) Inventors: Zoran Radivojevic, Cambridge (GB); Paul Beecher, Cambridge (GB); Chris Bower, Ely (GB); Piers Andrew, Cambridge (GB)

(73) Assignee: Nokia Corporation, Espoo (FI)

( * ) Notice: Subject to any disclaimer, the term of this patent is extended or adjusted under 35 U.S.C. 154(b) by 699 days.

(21) Appl. No.: 13/047,062

(22) Filed: Mar. 14, 2011

(65) Prior Publication Data
US 2012/0237043 A1    Sep. 20, 2012

(51) Int. Cl.
*H04R 25/00*    (2006.01)
*H04R 1/02*    (2006.01)
*G01B 17/08*    (2006.01)

(52) U.S. Cl.
CPC ....................... *G01B 17/08* (2013.01)
USPC ............................. 381/162; 381/91

(58) Field of Classification Search
CPC ...................................... G01B 17/08
USPC ................ 623/24; 73/172, 574–587; 84/604; 381/71.2, 58, 122
See application file for complete search history.

(56) References Cited

U.S. PATENT DOCUMENTS

| | | | |
|---|---|---|---|
| 7,935,881 B2 * | 5/2011 | Aimi | 84/734 |
| 2002/0082710 A1 * | 6/2002 | Lundborg | 623/24 |
| 2008/0034946 A1 * | 2/2008 | Aimi | 84/604 |
| 2011/0037707 A1 | 2/2011 | Radivojevic et al. | 345/173 |
| 2012/0086564 A1 * | 4/2012 | Sinha | 340/407.1 |

* cited by examiner

*Primary Examiner* — Fan Tsang
*Assistant Examiner* — Eugene Zhao
(74) *Attorney, Agent, or Firm* — Harrington & Smith

(57) ABSTRACT

An apparatus including a microphone; and a recording system including the microphone. The recording system includes a vibration bridge configured to couple the microphone to an apparatus chassis to receive surface vibrations when the apparatus chassis is coupled to a surface so as to create a file comprising surface texture information.

18 Claims, 10 Drawing Sheets

SURFACE TEXTURE RECORDING WITH MICROPHONE

BACKGROUND

1. Technical Field

The exemplary and non-limiting embodiments relate generally to recording surface texture and, more particularly, to using a microphone to record surface texture.

2. Brief Description of Prior Developments

A profilometer is a measuring instrument used to measure a surface's profile, in order to quantify its roughness or texture. A profilometer is normally a laboratory scale type of dedicated equipment. There exists both contact profilometers and non-contact optical profilometers.

SUMMARY

The following summary is merely intended to be exemplary. The summary is not intended to limit the scope of the claims.

In accordance with one aspect, an apparatus is provided including a microphone; and a profilometer system including the microphone. The profilometer system is configured to use vibrations received at the microphone to create a Surface Texture File (STF).

In accordance with another aspect, a method comprises mechanically connecting a hand-held device to a surface, where the hand-held device includes a microphone; receiving input at the microphone comprising vibrations from the surface; sending a signal from the microphone based upon the input received by the microphone; and creating a Surface Texture File (STF) based, at least partially, upon the signal from the microphone.

In accordance with another aspect, a program storage device is provided which is readable by a machine, tangibly embodying a program of instructions executable by the machine for performing operations, the operations comprising switching a mode of operation of an apparatus from a sound processing mode, for processing of signals from a microphone, to a profilometer mode; and creating a Surface Texture File (STF) based, at least partially, upon the signals received from the microphone while in the profilometer mode, where the signals are formed by the microphone based upon vibrations received at the microphone.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
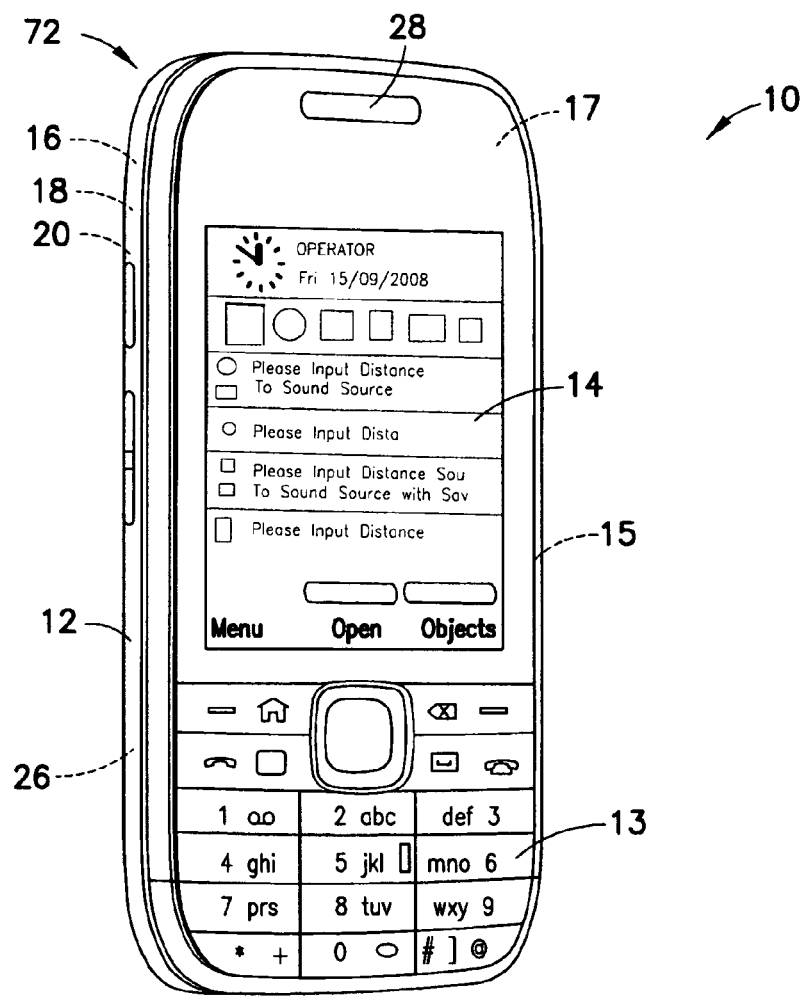
FIG. 1 is a perspective view of an example embodiment.

Although features will be described with reference to the example embodiments shown in the drawings, it should be understood that the features may be embodied in many alternate forms of embodiments. In addition, any suitable size, shape or type of elements or materials could be used.

Referring to FIG. 1, there is shown a perspective view of an apparatus 10 according to one example embodiment. In this example the apparatus 10 is a hand-held portable apparatus comprising various features including a telephone application, Internet browser application, camera application, video recorder application, music player and recorder application, email application, navigation application, gaming application, and/or any other suitable electronic device application. The apparatus may be any suitable portable electronic device, such as a mobile phone, computer, laptop, PDA, etc.

Figure 2:
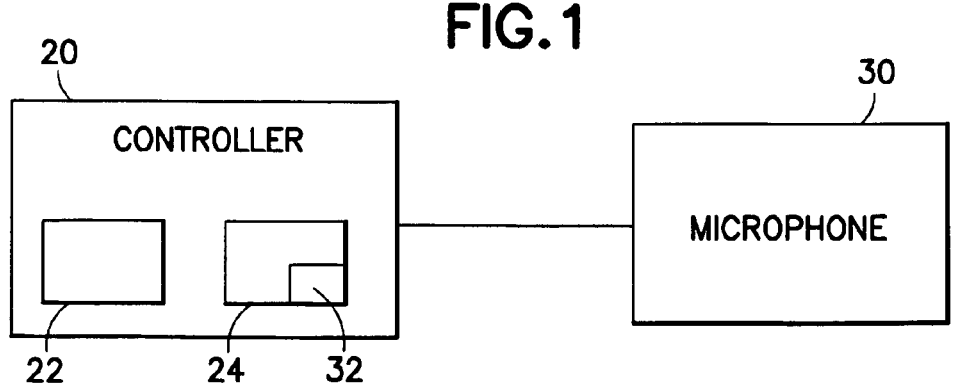
FIG. 2 is a diagram illustrating some components of the example shown in FIG. 1.

The apparatus 10, in this example embodiment, comprises a housing 12, a touch screen 14 which functions as both a display and a user input, keypad 13, and electronic circuitry including a printed wiring board 15 having at least some of the electronic circuitry thereon. The electronic circuitry can include, for example, a receiver 16, a transmitter 18, and a controller 20. Referring also to FIG. 2, the controller 20 may include at least one processor 22, at least one memory 24 and software. A rechargeable battery 26 is also provided.

The apparatus 10 is able to function as a telephone and, thus, comprises a speaker 28 and a microphone 30. The apparatus also comprises a profilometer system. In this example embodiment the profilometer system comprises the microphone 30, the controller 20 and specific profilometer software 32 stored in the memory 24. The controller 20 and profilometer software 32 are configured to use a signal from the microphone 30 to create a Surface Texture File (STF), such as a .dxt2, .dxt3, .dxt4, or .dds for example. Other STF file formats could be used. With the example embodiment shown, a portable system is capable of recording, reconstructing and representing the surface texture of an object which the user interacts with (such as clothes, skin, tables, walls, car, for example, and any other surface which people might touch and feel). A digital method is described for texture recording, and subsequent imitating/delivering of recorded tactile perceptions (such as by use of a Texture Recorder Imitator—TRI system). Data collected by the TRI system can be stored and subsequently shared, such as wirelessly shared or shared via the Internet for example. This enables remote tactile perception of an object and its surface(s) in a digital way. For example, a ceramic tile could have its surface texture recorded by use of an example embodiment and that information could be shared, such as via the Internet to people interested in purchasing the tile. This, of course is only one example.

In one type of example embodiment, the features described herein may provide a relatively simple and portable system for recording surface textures, saving/distributing the recording, and perhaps playing the recording by a programmable Electro-Tactile or Electrostatic-Tactile device (e.g., an Electro-Tactile (ET) surface built into a mobile phone). An example of an Electro-Tactile device is described in U.S. Patent Publication No. 2011/0037707 A1 which is hereby incorporated by reference in its entirety. Use of the audio-mechanical feature described herein, such as stimulated by a sliding a finger or the entire device against a surface for example, may be combined in what would otherwise be an audio file to carry information about the surface profilometry such as roughness, patterns, and structures. More precisely, an example embodiment can exploit moving contact against the surface by a user's finger, and/or the apparatus itself, for the file generation.

An interacting scenario may comprise the user sliding his or her fingernail against the surface, and holding the apparatus in a particular way to allow recording of the surface texture(s). The recording system may utilize the apparatus' existing microphone (e.g., with the microphone close to surface) with low power consumption requirements. A file is recorded in addition to possibly image taking, which enables textural information extraction, such as in addition to standard imaging for example.

An example embodiment uses the audio recording capability of a mobile phone to capture textural information about a surface explored by the user's touch and drag. In a simple arrangement, an ordinary microphone in a mobile device can be exploited. In more advanced solutions, an audio-mechanical push/pull button can be located in the vicinity of the microphone to provide an "audio bridge" or "vibration bridge" from the device chassis to the microphone.

Figure 3:
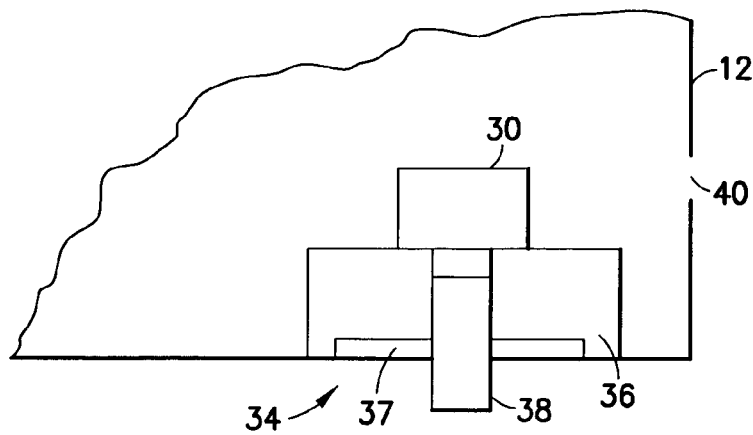
FIG. 3 illustrates connection of the microphone and chassis by a vibration bridge in the example shown in FIG. 1.
Figure 4:
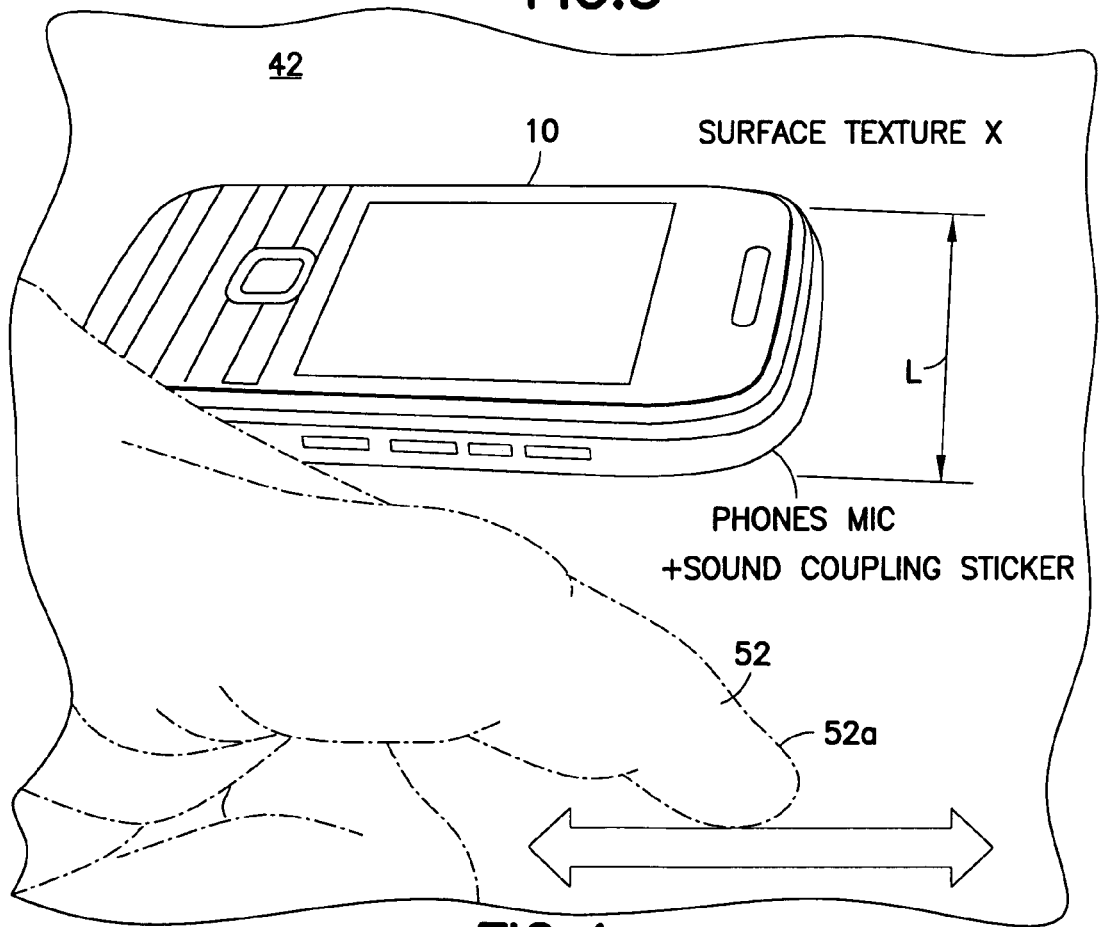
FIG. 4 illustrates a step during use of the example shown in FIG. 1.

Referring also to FIGS. 3 and 4, in this example embodiment the apparatus comprises the vibration bridge 34. The bridge 34 generally comprises a stationary member 37 and a movable member 38. The stationary member 37 and member 36 connect the microphone 30 to the frame or chassis 12. The chassis 12 comprises an audio hole 40 to allow sound to travel through the housing 12 to the microphone, such as during normal telephone use. The movable member 38 is movably mounted to the stationary member 37 and extends out from the housing 12. When the apparatus 10 is placed against a surface 42 as seen in FIG. 4, the movable member 38 can be pressed inward, such as by the user or by the surface 42 for example. The movable member 38 may be spring loaded in an outward direction, or might be a push/pull button manually moved by the user for example.

In this example, the bridge 34 consists of solid polymeric blocks and soft insulating foam 36 (as usually used when damping microphone audio features). The solid blocks are realized by using two parts, the stationary member 37 permanently connected to the interior of the device chassis 12 and the movable member 38 as a polymeric cylinder capable of sliding on user demand. Once the cylinder 38 is pushed inward, the microphone 30 is efficiently coupled to the device chassis 12, enabling efficient audio propagation and recording of the entire vibrations experienced on the device chassis 12. By this way, the user can select on-demand very efficient audio-mechanical coupling between the microphone 30 and the device's chassis 12 and, thus, prepare the apparatus 10 for a subsequent surface texture recording mode.

Figure 5:
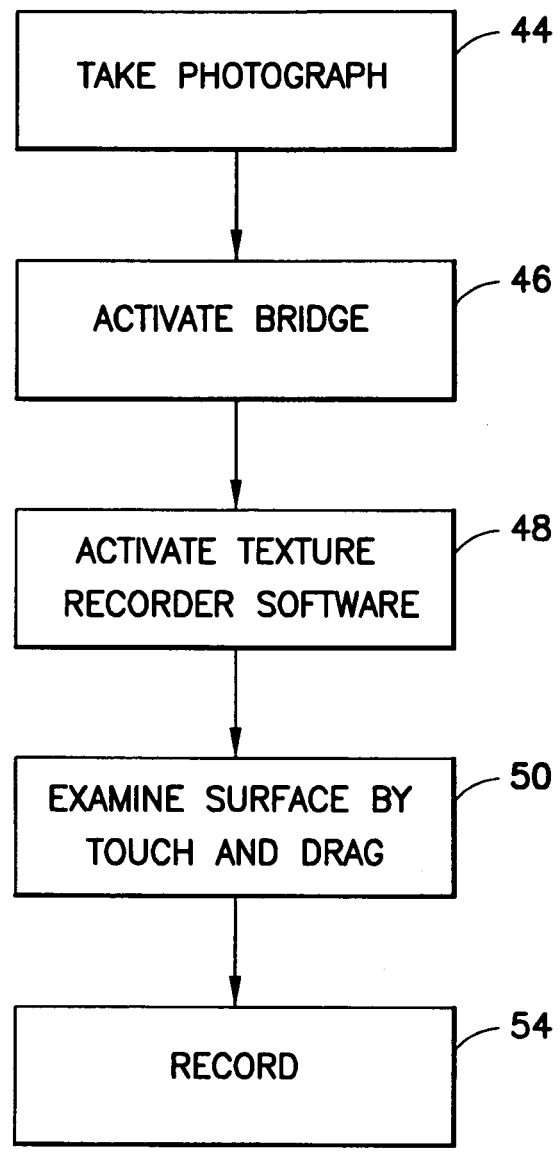
FIG. 5 is a block diagram illustrating steps in an example method.

The profilometer software 32 comprises a surface texture recording algorithm. Referring also to FIG. 5, the following scenario is an example of a method of when the user wants to record a texture of a surface. The user takes a photograph with the apparatus 10 of the surface 42 under examination as indicated by block 44. This step is an optional step. As indicated by block 46, the user pushes the audio-mechanical coupler button 38 of the bridge 34 to thereby couple the apparatus chassis 12 with the microphone 30. As indicated by block 48, the user activates the texture recorder software 32 in the apparatus 10, such as by use of the keypad 13 or touch screen 14 for example. Normally, the apparatus 10 would be set to a sound processing mode for processing of signals from the microphone, such as speech during a telephone conversation. When the user activates the texture recorder software 32, this can switch a mode of operation of the apparatus from the sound processing mode to a profilometer mode for processing of signals from a microphone. As indicated by block 50, the user then starts examining the surface by touch and drag having the phone in the vicinity and on the surface 42. The touch and drag may be by means of the user's finger 52 as indicated in FIG. 4. However, a tool such as a paperclip or other suitable physical object could be used to enhance sensitivity of the texture recording, for example.

The motion of the finger 52 against the surface generates vibrations which are received by the microphone 30. The vibrations may comprise sound waves generated by the finger 52 moving along the surface 42. The sound waves travel through the air and impact the chassis 12. The sound waves impacting the chassis are transmitted as vibrations to the microphone 30 through the bridge 34. The sound waves also travel through the air, through the hole 40, and to the microphone 30. The movement of the finger 52 along the surface 42 also causes vibrations to travel along the surface 42 itself, which impact the chassis 12. These vibrations are transmitted from the chassis 12, through the bridge 34, to the microphone 30.

The speed of the dragging of the finger 52 is variable. So, in this example, before examination of the surface 42, the user marks two lines on the surface 42. For example, the user can use the width L of the phone itself to mark the two lines and establish a predetermined length, such as about L=5 cm for example.

With this example, the apparatus 10 is placed on the surface 42 and the fingernail 52a slides on the surface 42. The apparatus 10 is placed on the surface and the chassis 12 is thereby coupled with the surface under examination. Because the chassis 12 is coupled by the bridge 34 to the microphone 30, the microphone 30 has efficient audio-coupling to the surface under examination. Once the recording software 32 is activated, the user slides the fingernail 52a on the surface 42 in close proximity to the apparatus 10. Dragging of the fingernail 52a on the surface 42 stimulates surface vibrations. The vibrations are influenced by the surface texture and are recorded on the apparatus 10 as indicated by block 54. The recorded data may be deconvoluted later for surface texture extraction.

Figure 6:
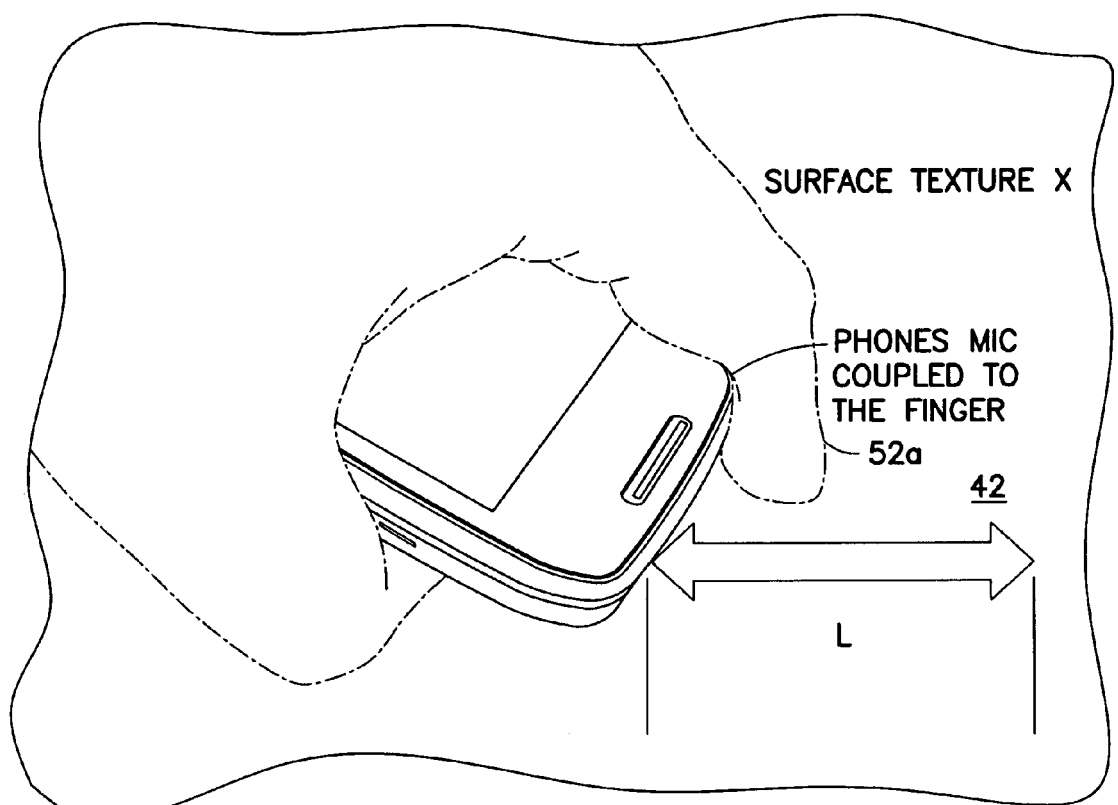
FIG. 6 illustrates a step during use of the example shown in FIG. 1 with a different example method.

The example described above is only one example. Referring also to FIG. 6, in this second example the apparatus 10 is held in the user's hand or palm. A fingernail 52a of the same hand is slid on the surface 42 while the apparatus is held in that hand. This second texture recording scenario involves the user holding the apparatus 10 and sliding the fingernail 52a on the surface 42 to record the surface texture. While holding the apparatus 10, the user keeps at least one finger close to the chassis 12 where the microphone 30 is located. By this way, the user enables the finger/flesh to be in intimate contact with the microphone, thereby transferring mechanical vibrations directly from the surface 42 under examination to the microphone 30 (via the finger flesh and chassis 12). Human flesh is a mainly liquid medium, which improves coupling conditions to the surface under examination. This second example does not need the bridge 34, but the bridge may be used.

Figure 7:
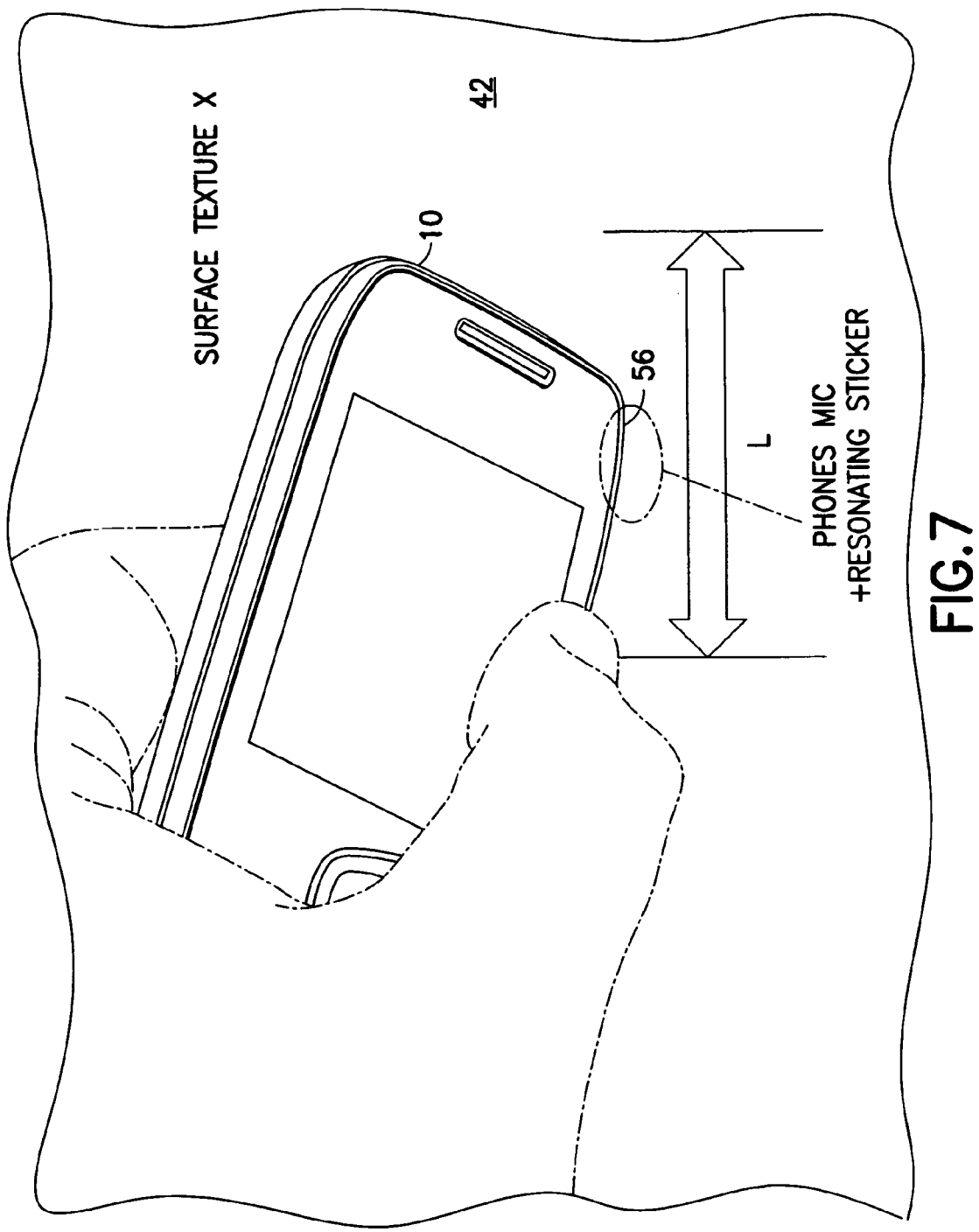
FIG. 7 illustrates a step during use of the example shown in FIG. 1 with another different example method.

Referring also to FIG. 7, in this third example the apparatus 10 is placed against the surface 42, and then the apparatus 10 itself is dragged on the surface 42. In this third texture recording scenario the apparatus 10 is directly dragged against the surface 42. One corner of the apparatus 10 is enhanced further by using a resonating sticker 56. The resonating sticker 56 might resemble a "Velcro-like" hooks structure for example. However, a resonating sticker might not be used. Such resonating sticker behaves as a mechanical vibration amplifier enabling better surface scanning capability and improving resolution of the surface texture examination. The entire apparatus 10 is gently dragged against the surface 42, and the generated audio-mechanical file is recorded. This third example does not use the bridge 34, but the bridge may be used.

Once the surface 42 is examined by an algorithm in one of above described scenarios, dedicated software is run in the apparatus to extract textural information. In one example, such information is used in parallel with visual information (photograph taken in step 44 for example) to document the surface look and feel information. This allows the possibility to replicate this surface (both image and texture together) by digital means. One example of replicating the texture and/or both the image and texture together by digital means could comprise use of an Electro-tactile surface system. However, any suitable replication system could be used.

Spectrum Analysis and Data Sharing

In the examples described above, the surface 42 is stimulated and an adequate audio-mechanical spectrum (AS) is recorded to characterize the surface texture by means of a recorded audio STF (Surface Texture File). The STF contains information about the surface texture (ST) which the user experiences when touching/dragging on the surface. In one embodiment, the recorded STF file is used without further alteration. In one example the recorded STF is directly input to a programmable Electro-tactile interface. The recorded STF can provide a unique audio signature to enable replication of the surface texture.

In all of the above mentioned texture recording scenarios, the user drags their finger/nail between pre-marked two lines giving limited length L for the finger movement. Since the time is recorded and the length of dragging is known the average speed of the movement (Va) can be calculated. By knowing Va, the surface texture can be approximated. For instance, if a surface has a regular series of bumps, then the recorded audio spectrum will consist of a series of amplitude peaks which correspond roughly to the bumps. If Va and frequency of the bumps are known, the texture of the surface can be extracted.

Several numerical methods can be used to obtain a 'characteristic frequency' of a particular surface which is independent of the exploration speed. One example method is where a fixed sampling length L is used (length or width of the phone 10 as reference dimension) and recording time in each case, so that the exploration speed can be calculated. Once the audio-mechanical spectrum (AS) is captured, it is possible to obtain the time taken by measuring the length of the audio-mechanical spectrum (AS) having a non-zero amplitude. For example, referring also to FIG. 8, in this graph of the audio-mechanical spectrum (AS), the surface exploration (finger dragging) event lasted approximately 0.75 seconds. Knowing that the length L of surface explored was approximately 10 mm, the speed of exploration was 13 mm/s.

Figure 8:
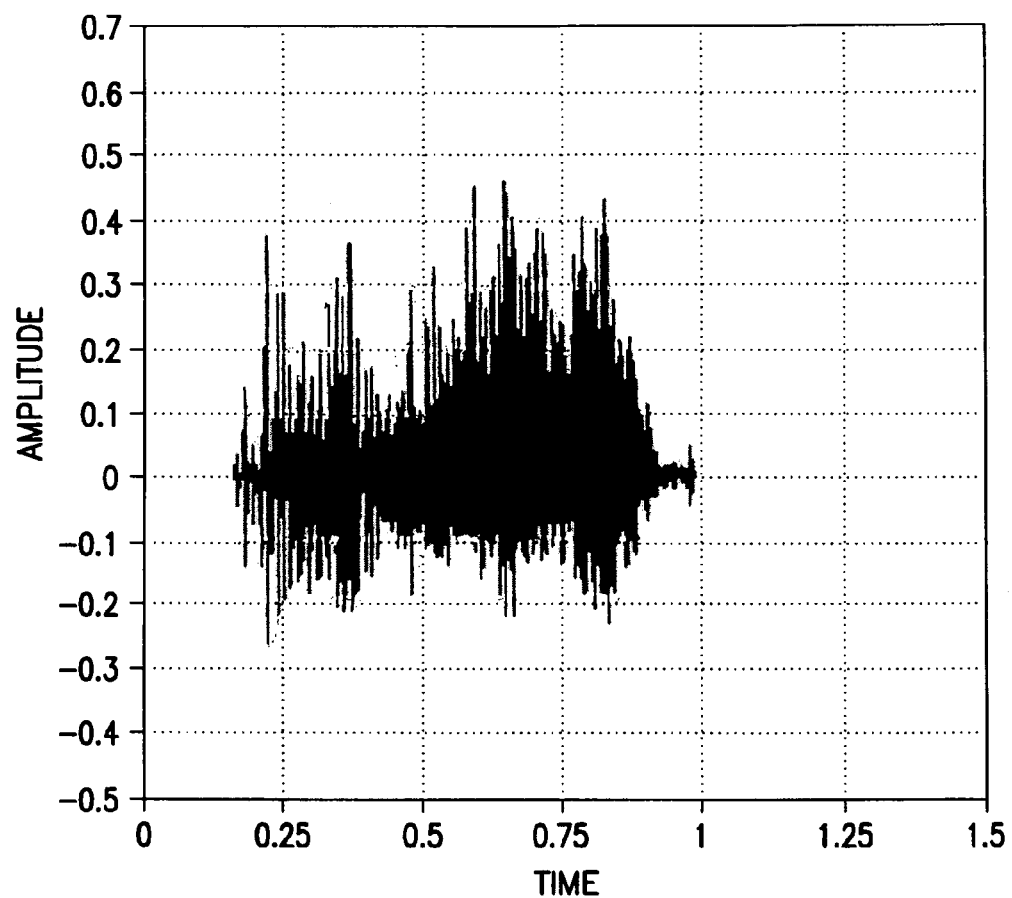
FIG. 8 is a graph illustrating an audio-mechanical spectrum (AS) during an example of a surface exploration event lasted approximately 0.75 seconds.
Figure 9:
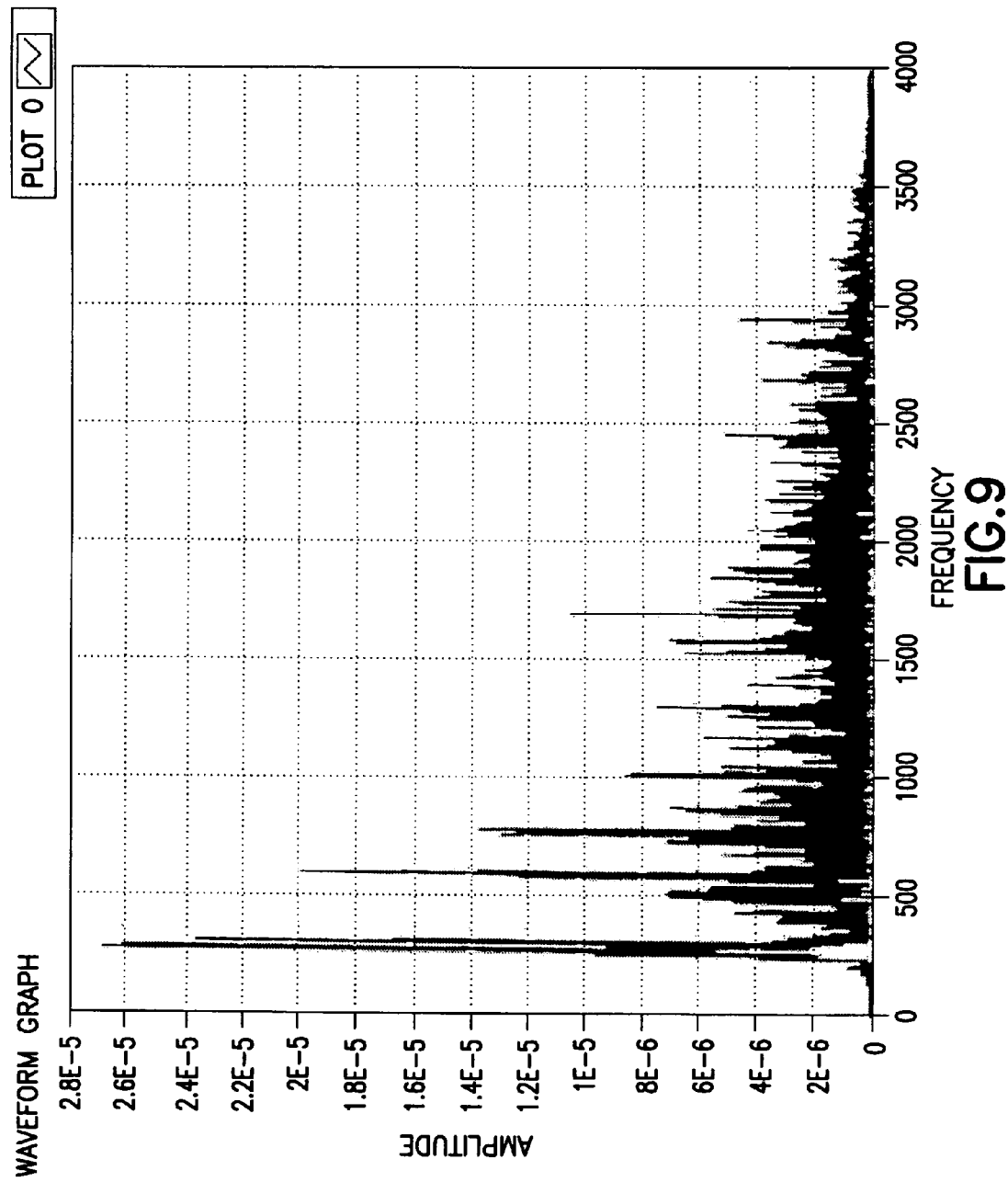
FIG. 9 is a graph illustrating a Fast Fourier Transform (FFT) of the data from FIG. 8 from which a characteristic frequency is obtained.

In one example, it is possible to extract frequency information about the surface texture (ST) by using relatively simple spectrum analysis software. For instance, simple Fourier analysis and/or protocols for finding principal components in the recorded spectrum can be used to obtain the basic information about the surface texture (ST). The Fast Fourier Transform (FFT) of the audio data from FIG. 8 is shown in FIG. 9 from which a characteristic frequency of 248 Hz is obtained.

Figure 10:
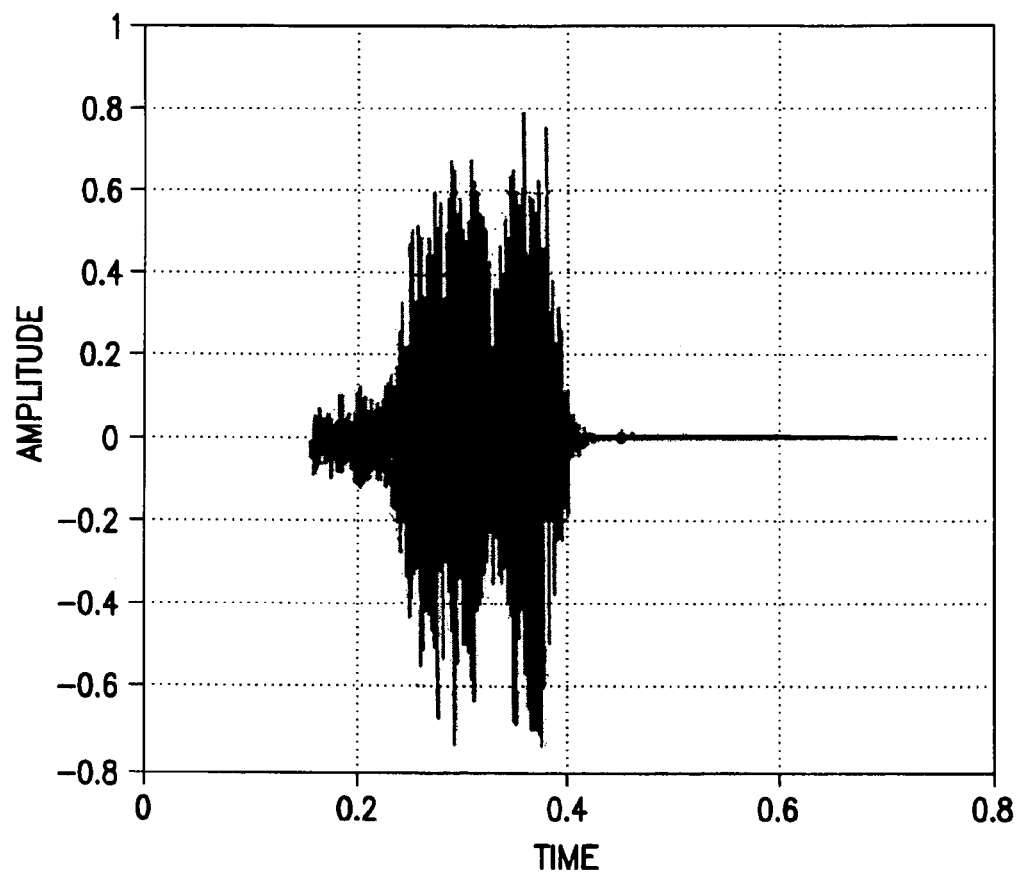
FIG. 10 is a graph illustrating an audio-mechanical spectrum (AS) during an example of a surface exploration event of the same surface as in FIG. 8, but for a shorter amount of time.
Figure 11:
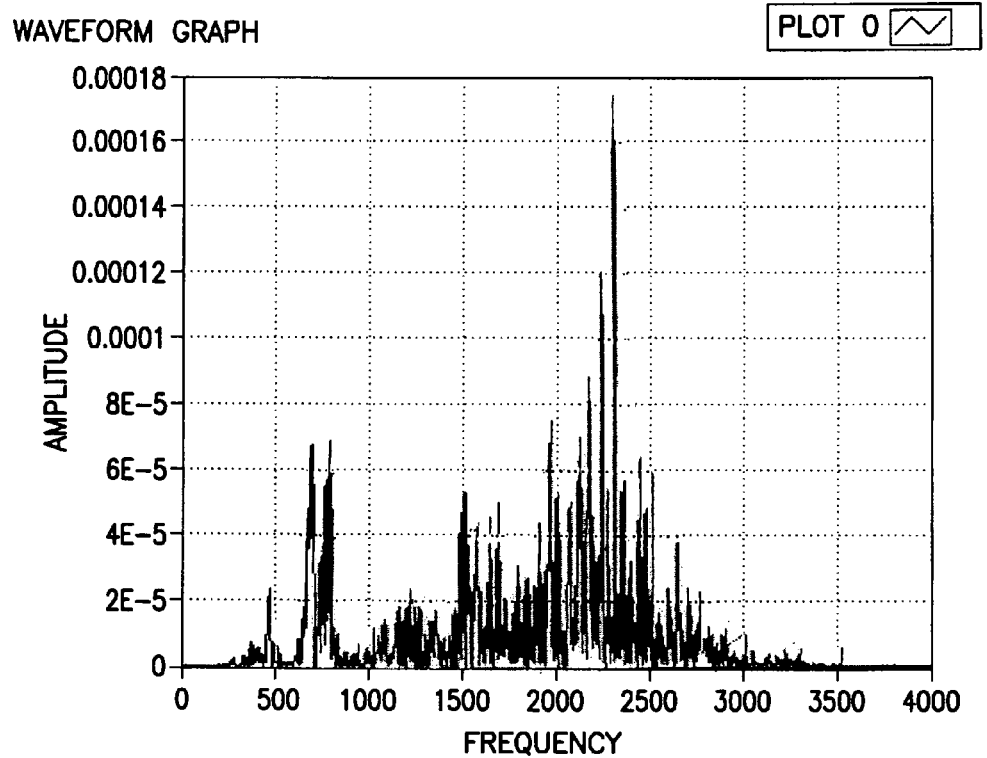
FIG. 11 is a graph illustrating a Fast Fourier Transform (FFT) of the data from FIG. 10 from which a characteristic frequency is obtained.

FIG. 10 shows the raw microphone output file for the same surface 42, but with a much higher exploration speed. The fast Fourier transform (FFT) of the audio data from FIG. 10 is shown in FIG. 11 from which a characteristic frequency of 2300 Hz is obtained. In this case the speed of exploration was 10/0.2=50 mm/s. With these examples, the principle components of the recorded Surface Texture File (STF) are associated with the surface texture and depict the texture in a digital way. This allows a given surface texture to be assigned a characteristic frequency. Whilst in these examples the characteristic frequency is clearly speed dependent, in general different users will explore surface textures at their own preferred speed. Thus, different users can have their own unique characteristic frequency. With the examples described above, the characteristic frequency is subsequently either fed directly into the Electro-tactile interface, or substituted via a lookup table with a frequency that is known to provide optimized Electro-tactile feedback.

It should be noted that, when in the profilometer mode, the output from the microphone does not merely create an audio file. Instead, a combination of vibrations from sound waves hitting the microphone 20 and vibrations received by the chassis 12 are used to create the Surface Texture File (STF). The vibrations received by the chassis 12 could be from direct contact with the surface 42 (such as shown in FIGS. 4 and 7) or indirect contact such as through the user's hand (as shown in FIG. 6). The bridge 43 can help to transmit this chassis received vibrations to the microphone 30; bypassing the vibration damping material 36.

In another example the texture information is captured from a photo of the surface (which can be taken using the mobile device 10 with or without additional magnification) and image processing algorithms are used to obtain a characteristic frequency from a FFT.

In another example, the texture information is captured from a recorded movie where the finger or the apparatus is dragged on the surface (which can be taken using the mobile device 10) in which case both audio data and image data are recorded simultaneously. Using image processing algorithms, a characteristic frequency is obtained from a FFT of both the audio and image data. In one example method, the reference length L is not used. Instead, the movement of the pixels seen by the camera is used to measure the speed of the movement directly.

If the device has an accelerometer, such as 17 in FIG. 1, data from the accelerometer might also be used to obtain a speed value. The software 32 may be configured to allow a user to select an initial material or characteristic of the surface. For example, when initiated the software could ask the user to indicate if the surface is soft or hard, or a fabric or tile. Based upon this initial user input, the sensitivity of the vibration sensing could be adjusted. For example, fabric might have a higher sensitivity than tile. Features described herein could also be used in conjunction with other inputs to record surface texture. For example, at a retail store display might have a wireless signal which the apparatus 10 could receive to use with the user's input to classify or enhance the recorded data. A first type of signal might be generated by a display of a first type of fabrics, while a second type of signal might be generated by a display of a second different type of fabrics, and the software could use the signal in combination with the user's vibration input to create the digital surface texture file. Although an example described above uses an internal vibration bridge, features described herein could use an external vibration bridge, such as provided at a store display, which the apparatus 10 could be connected to by the user for a temporary connection to enter the texture information. Any suitable vibration bridge to the microphone 30 could be used. The vibration bridge could provide vibration amplification to the microphone. In one type of example embodiment sound waves traveling though the hole 40 could be manually or automatically blocked such that only vibrations received elseware are used for the texture recording.

With the examples described above, Electro-tactile information can be added to a visual picture or movie of the particular surface and provide a digital form of the surface texture information (a digital surface texture (DST) file) which contains the picture or movie and also the extracted information about the surface texture.

Figure 12:
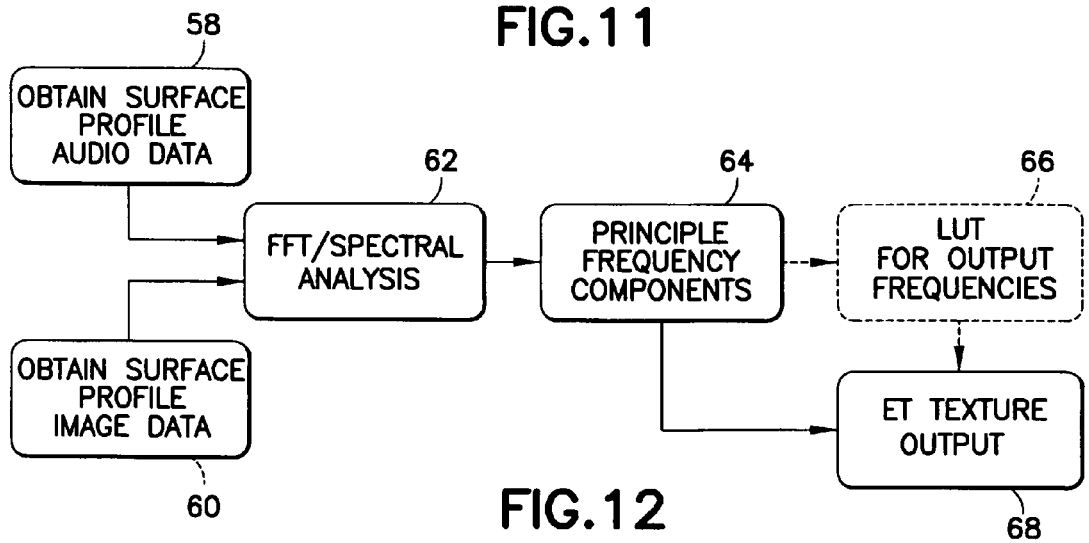
FIG. 12 is a block diagram illustrating steps of an example method.

FIG. 12 shows one example method of processing surface information for outputting textural information. The dashed areas are optional, i.e., the image data can also be used to obtain principle frequencies, and a Look Up Table (LUT) can be used to optimize output frequencies to the Electro-Tactile (ET) surface. In one example, the Electro-Tactile (ET) surface is part of the display 14. As illustrated in FIG. 12, the user obtains the surface audio-mechanical data as shown by block 58. As shown by optional block 60, the user may also obtain a surface profile image data. FFT/Spectral analysis is provided as indicated by block 62. Principle frequency components are determined as indicated by block 64. An optional Look-Up Table (LUT) may be used as indicated by block 66. The Electro-Tactile (ET) texture is subsequently output as indicated by block 68, when called for, to the Electro-Tactile (ET) surface, such as display 14.

In one example the digital surface texture (DST) data is shared. For example the digital surface texture (DST) file is shared in a wireless way (DST-MMS with photo and basic texture information) or used via the Internet (visual information is empowered by textural information). For example, the texture of clothes or fabric may be electronically transmitted and simulated on an electronic texture simulation device or display which a user can touch before deciding to buy.

Figure 13:
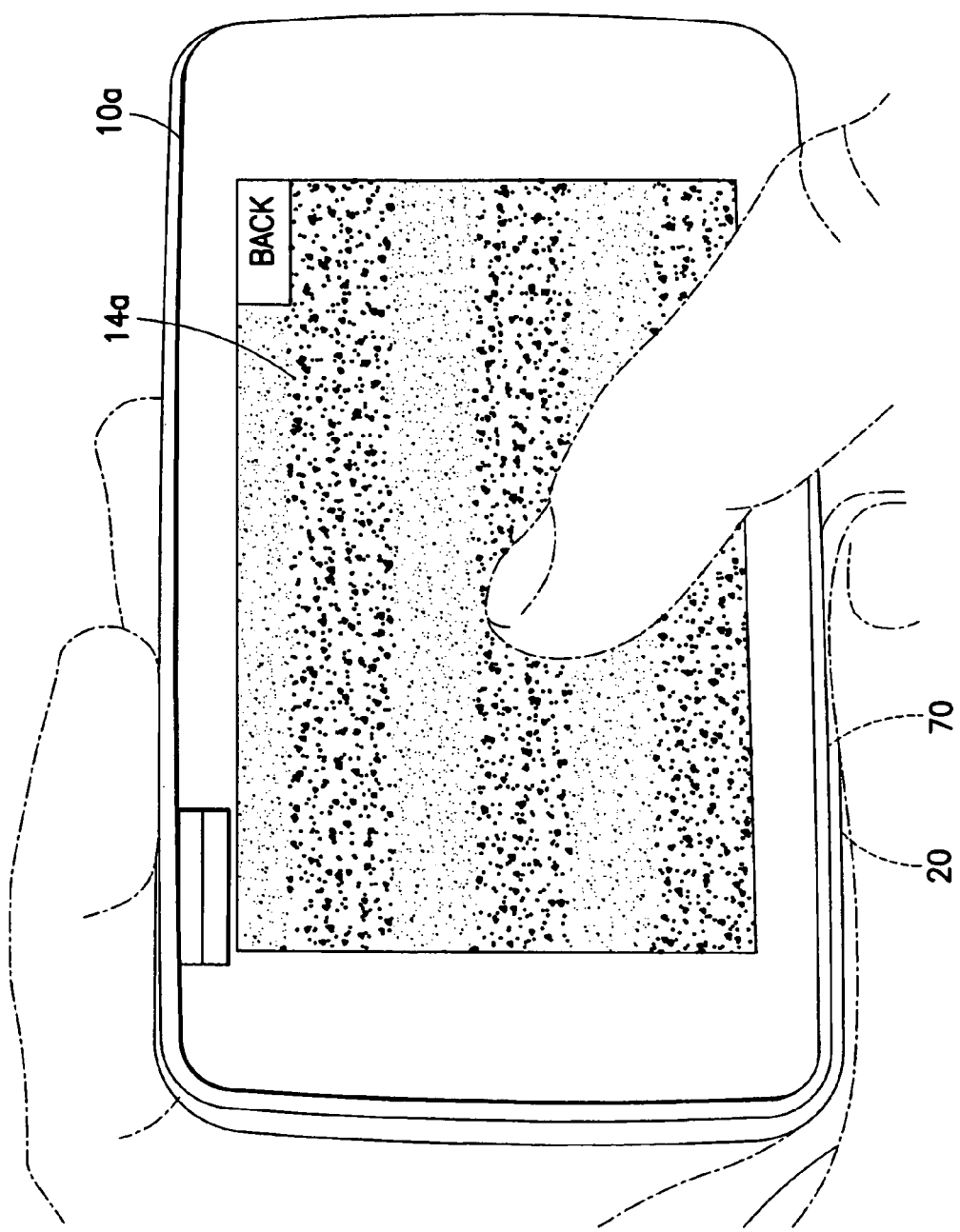
FIG. 13 illustrates another example apparatus showing how both image data and texture data may be combined as visual and tactile output on the display.

As indicated above, the stored texture data is usable by a Electro-Tactile (ET) surface which functions as a Texture E-imitator. In an example method, once the digital surface texture (DST) file has been formed and the surface texture (ST) information is extracted, this information is fed to the Electro-tactile display device and its controller. FIG. 13 shows another example of an apparatus 10a having a touch screen display 14a which has an Electro-Tactile (ET) surface configured to function as part of an Electro-tactile display device.

The controller 20 functions as the Electro-Tactile (ET) system controller, and uses the surface texture (ST) information to generate an adequate density of electro tactile pulses, which are delivered to the Electro-Tactile display 14a to generate virtual textures. Such a system enables the user to hold his apparatus 10a, such as a mobile phone, see the graphical image 70 of a digital surface texture (DST) file on the display 14a, and feel the accompanying texture on the display 14a at the image of the displayed visual object. This enables virtual textures to be perceived in parallel with the graphical information. Also, textures can be shared with others or recorded by the phone and stored in an image texture database.

Components of the example Texture Recorder Imitator systems described above are:
 Mobile device with enhanced audio mechanical features;
 Software program for extraction of the principal component related to the surface texture;
 Electro-Tactile display;
 Data sharing and storing capabilities.

Three interaction and surface exploration arrangements are described above for the mobile device with enhanced audio mechanical features. However, other arrangements could be provided. In the three examples described above, the mechanical vibrations generated on the surface are directly streamed to the microphone of the apparatus (via user finger/nail/flesh and/or via audio coupler inserted close to microphone and/or resonating sticker).

The example software for surface texture extraction described above uses Fourier transformation and/or principal component analysis protocols to obtain basic information about the surface textures. However, other software could be used.

An Electro-Tactile display device need not be provided in the same apparatus. The Electro-Tactile controller in the examples described above is fed by the principal component obtained from the DST file and adequate ET stimulation is made to obtain virtual ET textures.

The apparatus might not share the stored texture data. However, in the examples described above, the DST file is stored/shared (such as DST-MMS) to enrich visual information and gain new look and feel for user experiences on mobile platforms and/or via the Internet.

Advantages include:
 Potential solution for introduction of digital texture in a form of programmable virtual textures (new user experiences, new look and feel)
 Possibility to record surface textures of objects in daily environment
 Potential to form digital texture database which can be shared/used via the Internet in commercial contexts (e.g., seeing and touching virtual objects on eBay, etc. . . . )

The examples described above provide a hybrid contact/non-contact profilometer which may use vibrations from both sound and non-sound components to create a surface texture file (STF). The profilometer uses a microphone of a mobile device, such as a mobile telephone. Thus, the microphone is used for multiple purposes; not merely recording sound such as speech.

An example embodiment comprises an apparatus comprising a microphone 30; and a profilometer system comprising the microphone, where the profilometer system is configured to use both non-sound mechanical vibrations received at the microphone and sound received at the microphone to create a Surface Texture File (STF). An example embodiment comprises a vibration bridge 34 between a frame of the apparatus and the microphone. An example embodiment comprises the vibration bridge including a stationary member 36 connected to the microphone and a movable member 38 movably connected to the stationary member and at least partially extending from the frame 12. An example embodiment comprises a resonating sticker 56 at an exterior surface of the apparatus. An example embodiment has the profilometer system further comprising a camera 72 (see FIG. 1). An example embodiment has the profilometer system comprising means for combining information from an image taken from the camera with the non-sound mechanical vibrations and sound to create the Surface Texture File (STF). An example embodiment comprises an electro-vibration tactile device 14, 14a configured to be touched by a user, where the apparatus is configured to move at least a portion of the electro-vibration tactile device based upon information stored in the Surface Texture File (STF). An example embodiment the electro-vibration tactile device is provided at a display. An example embodiment comprises a transmitter configured to send a wireless signal from the apparatus comprising the Surface Texture File (STF).

An example method comprises mechanically connecting a hand-held device to a surface, where the hand-held device includes a microphone; receiving input at the microphone comprising both non-sound mechanical vibrations from the surface and sound from the surface; sending a signal from the microphone based upon the input received by the microphone; and creating a Surface Texture File (STF) based, at least partially, upon the signal from the microphone.

In one type of example, the step of mechanically connecting comprises a finger of a user connecting the hand-held device to the surface. In one type of example, the step of mechanically connecting comprises placing a movable member of a vibration bridge against the surface, where a stationary member of the vibration bridge is attached to the microphone. In one type of example, the step of mechanically connecting comprises placing a resonating sticker, which is located at an exterior of the hand-held device, on the surface. In one type of example, a finger of a user or a portion of the hand-held device is moved along the surface to create the input. In one type of example, the method further comprises moving the finger or the portion a predetermined distance, and determining an average speed of movement, based upon a duration of the sound, in order to create the Surface Texture File (STF). In one type of example, the method further comprises combining information from an image with the non-sound mechanical vibrations and sound to create the Surface Texture File (STF). In one type of example, the method further comprises moving at least a portion of an electro-vibration tactile device, configured to be touched by a user, based upon information stored in the Surface Texture File (STF). In one type of example, the method further comprises obtaining a characteristic frequency, of the sound and the non-sound mechanical vibrations for creating the Surface Texture File (STF), independent of knowing a speed of movement used to create the sound and the non-sound mechanical vibrations.

In one type of example, a program storage device is provided, such as in the memory 24 for example, readable by a machine, tangibly embodying a program of instructions executable by the machine for performing operations, the operations comprising switching a mode of operation of an apparatus from a sound processing mode, for processing of signals from a microphone, to a profilometer mode; and creating a Surface Texture File (STF) based, at least partially, upon the signals received from the microphone while in the profilometer mode, where the signals are formed by the microphone based upon both non-sound mechanical vibrations received at the microphone and sound received at the microphone. In one type of example, the operations further comprise moving at least a portion of an electro-vibration tactile device of the apparatus, configured to be touched by a user, based upon information stored in the Surface Texture File (STF).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
a microphone; and
a recording system comprising the microphone, where the recording system comprises a vibration bridge configured to couple the microphone to an apparatus chassis to receive surface vibrations when the apparatus chassis is coupled to a surface so as to create a file comprising a surface texture.

2. An apparatus as in claim 1 where the vibration bridge comprises a stationary member connected to the chassis of the apparatus and a movable member movably connected to the stationary member, where the movable member at least partially extends from a frame.

3. An apparatus as in claim 1 further comprising a resonating sticker at an exterior surface of the apparatus.

4. An apparatus as in claim 1 where the recording system further comprises a camera.

5. An apparatus as in claim 4 where the recording system comprises means for combining information from an image taken from the camera with the vibrations to create the file.

6. An apparatus as in claim 1 further comprising an electro-vibration tactile device configured to be touched by a user, where the apparatus is configured to move at least a portion of the electro-vibration tactile device based upon information stored in the file.

7. An apparatus as in claim 6 where the electro-vibration tactile device is provided at a display.

8. An apparatus as in claim 1 where the apparatus comprises a transmitter configured to send a wireless signal from the apparatus comprising the file.

9. A method comprising:
mechanically connecting a hand-held device to a surface, where the hand-held device includes a microphone;
receiving input at the microphone comprising surface vibrations from the surface;
sending a signal from the microphone based upon the input received by the microphone; and
creating a file comprising surface texture information based, at least partially, upon the signal from the microphone,
where the step of mechanically connecting comprises placing a chassis of the hand-held device against the surface, and moving a movable member of a vibration bridge to structurally rigidify a connection of the microphone with the chassis.

10. A method as in claim 9 where the step of mechanically connecting comprises a finger of a user connecting the hand-held device to the surface.

11. A method as in claim 9 where the step of mechanically connecting comprises placing a resonating sticker, which is located at an exterior of the hand-held device, on the surface.

12. A method as in claim 9 where a finger of a user or a portion of the hand-held device is moved along the surface to create the input.

13. A method as in claim 12 further comprising moving the finger or the portion a predetermined distance, and determining an average speed of movement, based upon a duration of the sound, in order to create the file.

14. A method as in claim 9 further comprising combining information from image data with data from the vibrations to create the file.

15. A method as in claim 9 further comprising moving at least a portion of an electro-vibration tactile device, configured to be touched by a user, based upon information stored in the file.

16. A method as in claim 9 further comprising obtaining a characteristic frequency of the vibrations independent of knowing a speed of movement used to create the vibrations.

17. A non-transitory program storage device readable by a machine, tangibly embodying a program of instructions executable by the machine for performing operations, the operations comprising:
   switching a mode of operation of an apparatus from a sound processing mode, for processing of signals from a microphone, to a profilometer mode; and
   creating a file comprising surface texture information based, at least partially, upon the signals received from the microphone while in the profilometer mode, where the signals are formed by the microphone based upon surface vibrations received at the microphone from a surface physically coupled to the microphone at least partially by a vibration bride of the apparatus coupled to a chassis of the apparatus.

18. A program storage device as in claim 17 where the operations further comprise moving at least a portion of an electro-vibration tactile device of the apparatus, configured to be touched by a user, based upon information stored in the file.

* * * * *

UNITED STATES PATENT AND TRADEMARK OFFICE
CERTIFICATE OF CORRECTION

PATENT NO. : 8,824,704 B2
APPLICATION NO. : 13/047062
DATED : September 2, 2014
INVENTOR(S) : Radivojevic et al.

It is certified that error appears in the above-identified patent and that said Letters Patent is hereby corrected as shown below:

In the Claims

Claim 17, col. 11, line 21 "bride" should be deleted and --bridge-- should be inserted.

Signed and Sealed this
Eighteenth Day of November, 2014

Michelle K. Lee
*Deputy Director of the United States Patent and Trademark Office*